US008777238B1

(12) United States Patent
Blackwood

(10) Patent No.: US 8,777,238 B1
(45) Date of Patent: Jul. 15, 2014

(54) MEDICAL EMERGENCY PORTABLE LIFT CHAIR

(71) Applicant: William A Blackwood, Bend, OR (US)

(72) Inventor: William A Blackwood, Bend, OR (US)

( * ) Notice: Subject to any disclaimer, the term of this patent is extended or adjusted under 35 U.S.C. 154(b) by 0 days.

(21) Appl. No.: 13/916,450

(22) Filed: Jun. 12, 2013

(51) Int. Cl.
*B62B 7/02* (2006.01)

(52) U.S. Cl.
USPC .................................. 280/47.25; 297/344.12

(58) Field of Classification Search
USPC ........ 280/47.131, 47.17, 47.19, 47.24, 47.25, 280/650, 657, 250.1; 297/330, 344.2
See application file for complete search history.

(56) References Cited

U.S. PATENT DOCUMENTS

| | | | | |
|---|---|---|---|---|
| 2,975,435 | A * | 3/1961 | Forrest | 5/507.1 |
| 3,123,400 | A * | 3/1964 | Paulson | 297/314 |
| 4,569,094 | A * | 2/1986 | Hart et al. | 5/87.1 |
| 4,633,538 | A * | 1/1987 | James | 5/83.1 |
| 6,425,146 | B1 * | 7/2002 | O'Brien et al. | 4/560.1 |
| 6,941,595 | B1 * | 9/2005 | Michael | 5/83.1 |
| 7,523,949 | B1 * | 4/2009 | Galfin | 280/35 |
| 7,716,759 | B2 * | 5/2010 | Wilder | 5/83.1 |
| 7,827,630 | B2 * | 11/2010 | Bostelman et al. | 5/87.1 |
| 2003/0011228 | A1 * | 1/2003 | Komura et al. | 297/344.12 |
| 2004/0189071 | A1 * | 9/2004 | Komura et al. | 297/311 |
| 2005/0039256 | A1 * | 2/2005 | Price et al. | 5/86.1 |
| 2005/0217025 | A1 * | 10/2005 | Barattia | 5/86.1 |

* cited by examiner

*Primary Examiner* — J. Allen Shriver, II
*Assistant Examiner* — Bridget Avery
(74) *Attorney, Agent, or Firm* — Mark S. Hubert

(57) ABSTRACT

A medical emergency portable lift chair assembly adapted to be tiltably wheeled through a doorway and to safely, slowly lift a person off of the ground. It may be powered through a supplied DC battery or through an AC power source. The unit is capable of lifting several hundred pounds up to a safe seating height. It utilizes a high torque linear actuator mounted onto a base frame that raises or lowers a ram coupled to a moveable platform by a pair of redundant pulley arrangements. The base frame sits directly on the floor when the chair assembly is not being wheeled to provide support for the load to be raised. The moveable platform descends to the floor within the framework of the base frame and has a thin graspable chair affixed thereto that resides approximately no more than ¾" off the floor. A person who has fallen and cant get up may bring themselves in proximity to the chair either frontwards or rearwards, scoot themselves partially on the chair or grasp the chair, and then their weight can be safely raised off of the ground.

10 Claims, 6 Drawing Sheets

MEDICAL EMERGENCY PORTABLE LIFT CHAIR

BACKGROUND OF THE INVENTION

The present invention relates to a portable lift chair assembly capable of assisting a fallen person, I.E. after fainting, leg collapse, heart attack etc. to be safely raised off of the floor.

Falls and collapses by the weak and elderly in the hospital, retirement home, or private residence are commonplace. Getting these people back to an upright, seated position or an elevated position is dangerous and tricky. Often it requires partial help by the victim themselves and often it is not able to be accomplished by another person alone. When the victim has to help, there is often a further strain or injury to the victim. The act of lifting dead weight up off of the floor is very difficult and as a result, many a hospital worker has injured themselves in the lifting attempt. Statistics for back injuries to nurses precipitated by patient handling varied from 14.2 per 100 full time employees for Intensive Care Unit (ICU) Nursing to 3.8 per 100 FTE for Pediatric Nursing.

When a person falls, often time is of the essence and there may not be a party of sufficient stature to raise the person up again without injury to themselves or the person. While hospitals have stretchers around, these require two strong, trained people to operate without worsening the situation. Other than the stretcher, there are no other devices to assist in this task. In a private residence, if the person cannot be raised by the other occupants they may have to remain on the floor until help arrives.

Wheelchairs, crutches, canes and the like are meant for people in a standing or seated position and are of no help when the person is down. Even then, these cannot handle the entire lifting load throughout the entire process. Because of the specific situation of each fall and each person and each helper, the actual lift may have to be broken down into several smaller segments and to different final heights.

Henceforth, a portable medical emergency portable lift chair would fulfill a long felt need in the medical industry industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a portable device, capable of fitting through a narrow, standard doorway that is able to slowly and gently raise a fallen person off of the ground to any desired height while providing both safety and convenience for the fallen person as well as the user. More particularly, to a medical emergency portable lift chair operating or either AC or DC battery power source and capable of descending directly to the floor such that the entire load for the entire lift may be done effortlessly and by one helper only. The unit has a remote control to raise or lower the chair such that the helper may come around the front of the chair to assist the fallen person. The capacity of the lift chair may be adjusted with the size of the linear actuator used, however the standard unit will have a capacity large enough to raise even the morbidly obese.

It has many of the advantages mentioned heretofore and many novel features that result in a new medical lifting device which is not anticipated, rendered obvious, suggested, or even implied by any of the prior art, either alone or in any combination thereof.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
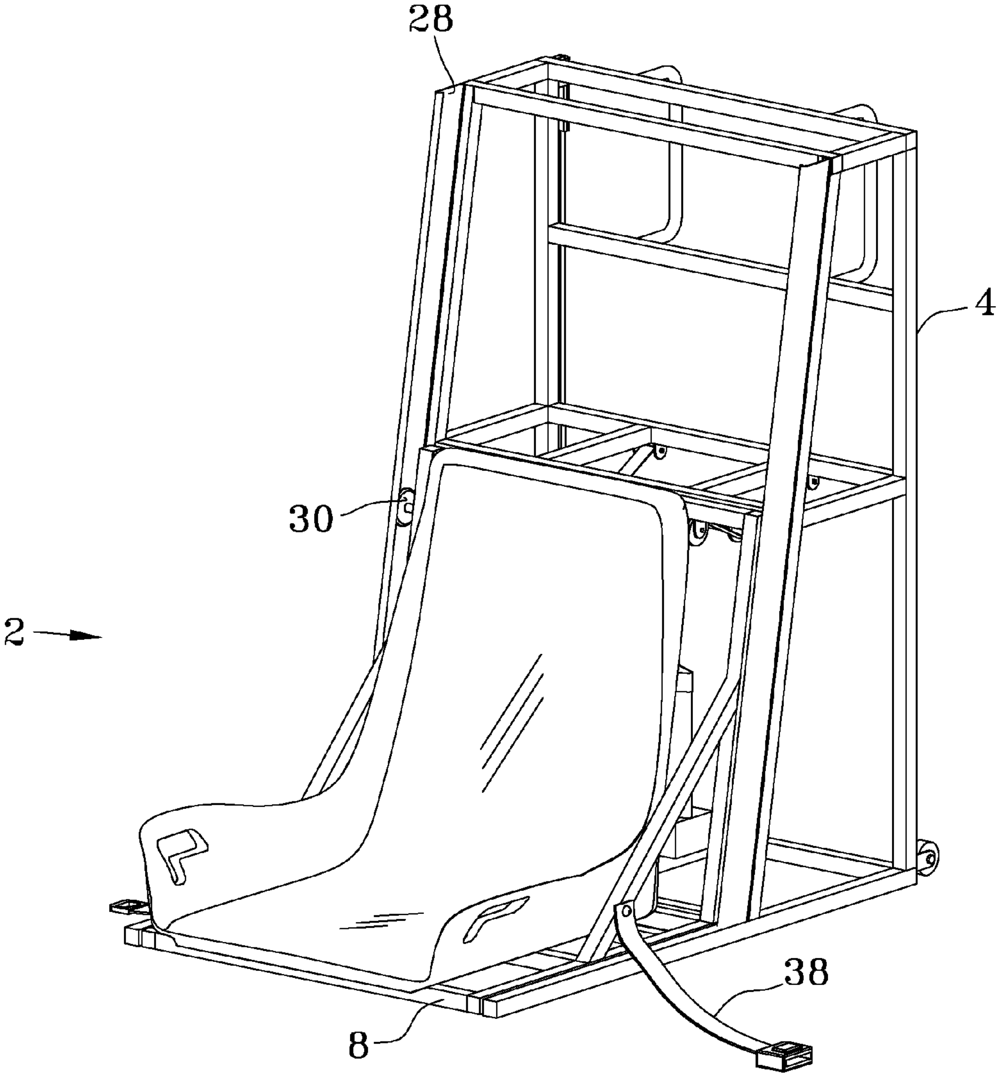
FIG. 1 is a front perspective view of the lift chair in its lowest position.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 2:
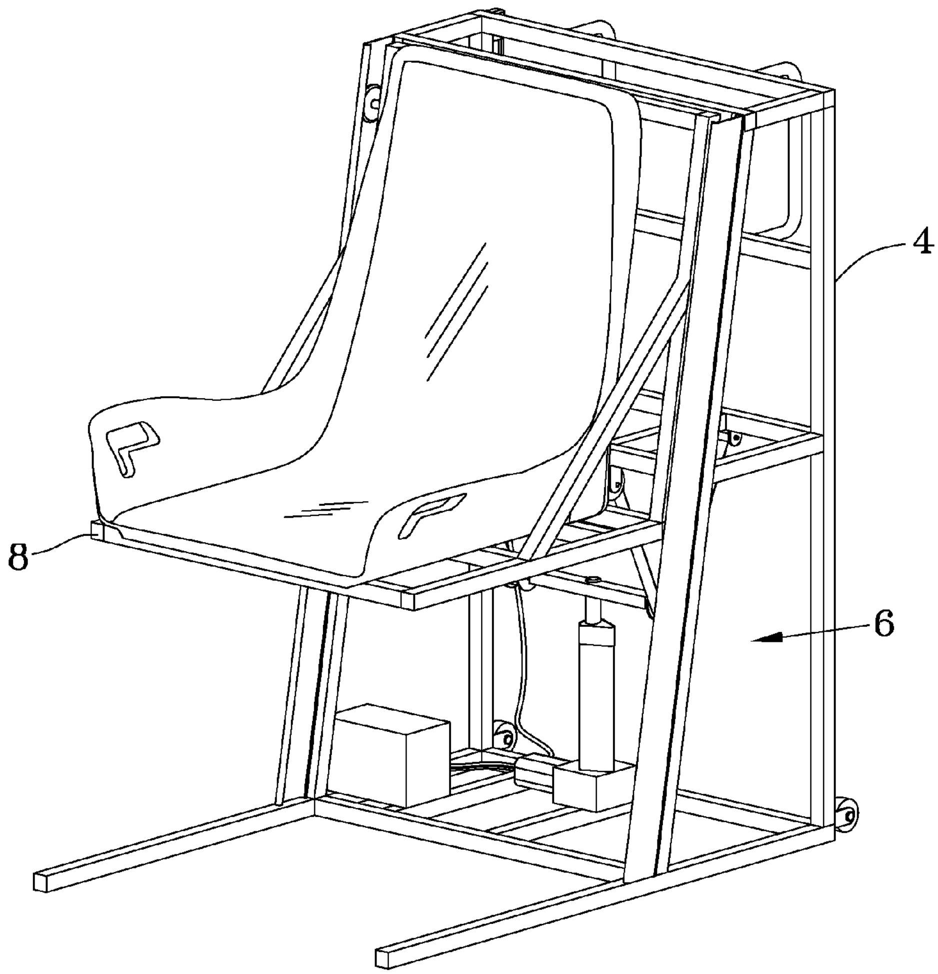
FIG. 2 is a front perspective view of the lift chair in its raised position.

It is important to realize that the lift chair is designed to safely lift a fallen person to any desired height but that it is not designed to transport the person thereafter. From the raised position, the person may be able to stand by themself or may be placed on a nearby wheelchair or gurney for transport. The unit can also hold the person in that raised position indefinitely. Its narrow profile allows it to be utilized in the narrowest of doorways and its ability to descent its lift carriage to the floor lets a downed person to scoot themselves backwards onto the seat for raising. Its operation does not require a strong individual. A child or small woman can operate it in a manner that is safe and efficient to both them and the downed individual. The lift chair 2 has three components; a base frame 4; a lift system 6 and a lift carriage 8. (FIGS. 1 and 2) It is made of a strong but lightweight material such a aluminum, thin walled steel or metal, a strengthened polymer, or a combination thereof. Simply stated, the base frame is designed to fit through a standard sized residential doorway and has a width no larger than 29½ inches. The lift carriage 8 is nestled within the base frame 4 and is raised and lowered by the lift system 6 which is mounted on the base frame behind the lift carriage 8 and operably connected between the base frame 4 and the lift carriage 8 by a pair of belts.

Figure 3:
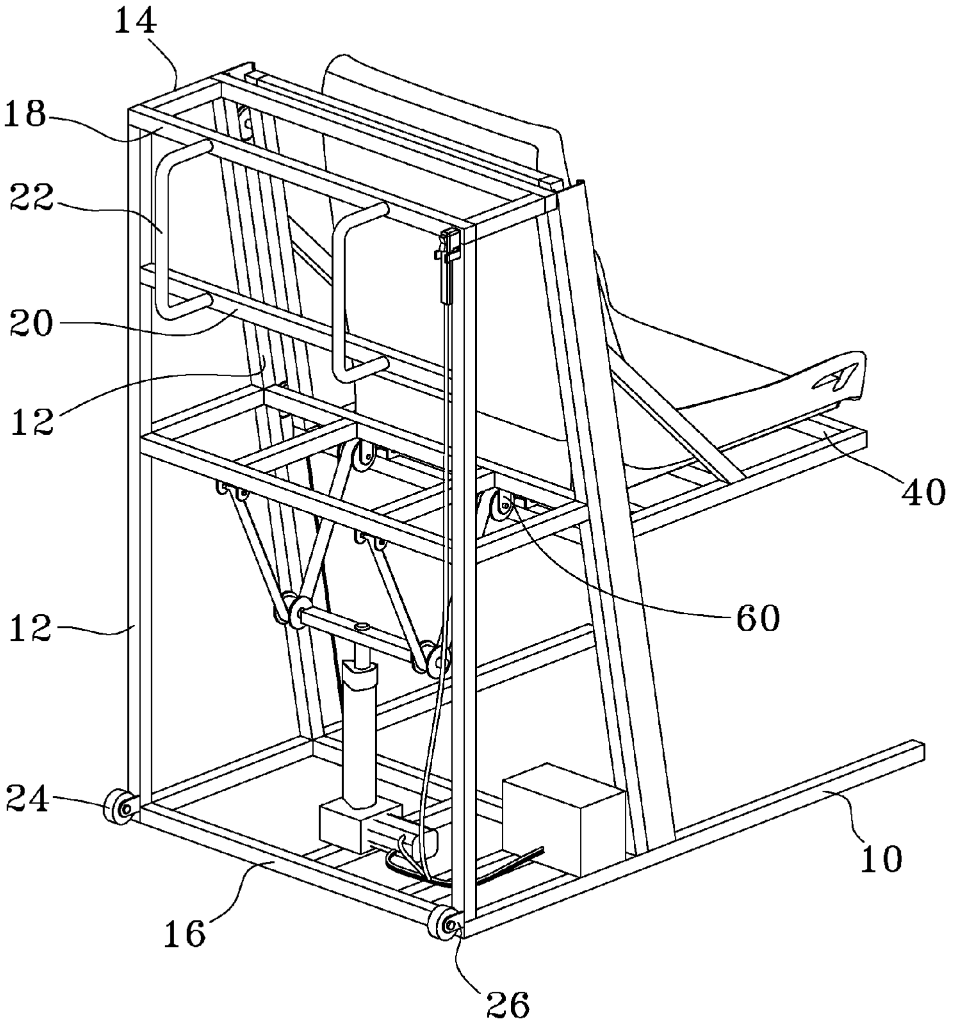
FIG. 3 is rear perspective view of the lift chair in its raised position.

The base frame 4 has an "A" configuration when viewed from the side. It has two parallel, mirror image sides each having a horizontal base support leg 10 made of square tubing that is affixed to the bottom of a vertical support 12. The vertical supports 12 are held in a non parallel configuration by a side top support 14 located at the top of the pair of vertical supports 12. The two sides are connected by a pair of parallel bottom connector members 16, a pair of parallel top connector members 18 and an upper connector member 20 residing between the top connector member 18 and the upper connector member 16. A set of handles 22 extend normally from the base frame 4 spanning between one of the top connector members 18 and the upper connector member 20. A set of wheels 24 are each rotationally mounted on a set of wheel mounting brackets 26 that extend normally from a vertical support 12. The wheels 24 do not touch the ground when the lift chair 2 is in its resting position with the horizontal base support legs 10 fully contacting the ground. When the handles 22 are pulled downward and backward, the lift chair 2 tilts backward until the wheels 24 contact the ground and the lift chair can then be wheeled to its desired location. (FIG. 3)

Affixed to the front vertical supports 12 and the base support legs 10 are two parallel "C" channels 28 such that their open channels face each other and form the mast. They extend from the horizontal plane of the base frame 4. These C channels 28 act as a guide track and are sized so as to accommodate the mast wheels 30 for rotational support such that the mast wheels 30 are unable to exit the mast other than through the open upper end of the C channels 28. It is important that the identical, parallel, front vertical supports 12 and identical, parallel "C" channels 28 of the mast angle backwards from a vertical plane located at the front of the lift chair 2. This allows the lift carriage 8 to be raised safely up and back from where the person is downed. This direction of angular upward lift prevents the person from falling off as the lift carriage 8 rises and pulls them slightly back from where they fell minimizing any potential joint or back injury. In an alternate embodiment, the "C" channels may not be linear but rather angled steeper in the last section of travel. In this way the lift chair would lift the disabled person backwards and upwards but as they neared the top of travel, would tilt the chair further back to allow the person's weight to shift backwards into the seat 42 thereby cradling or stabilizing them in the seat 43. This would prevent the person from falling out or shifting their positions rapidly and unwantedly. When traveling in the seat 42, the change in the two directional travel (occurring at the change in the angle of the "C" channels) helps to signal the parties (the operator and the disabled person) that the chair lift has risen them to the end point.

It is to be noted that the distance between the outside of the horizontal base support legs 10 is less than the width of a smaller, 30" door jam casing. Although for specific situations the lift chair 2 could be made narrower, generally the smallest hallway door encountered in a residence is 30". Since the handles 22 and wheels 24 extend from the rear of the base frame 4 the widest portion of the chair lift 2 are the sides/base support legs 10.

Figure 4:
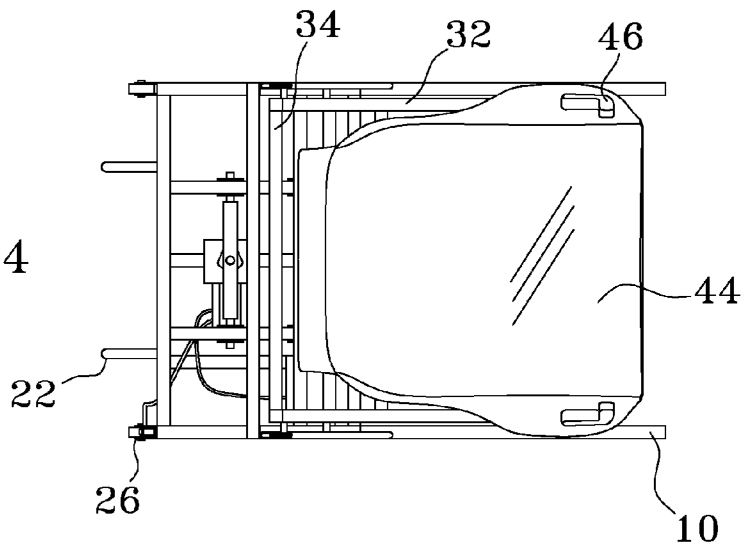
FIG. 4 is a top view of the lift chair.

The lift carriage 8 is comprised of the chair lift components that rise vertically. (FIGS. 3-5) The lift carriage 8 has a generally "L" shaped frame of a planar bottom base 32 affixed to a planar back base 34. The bottom base 32 has a series of slats 40 to support the seat 42 although a planar substrate such as plywood could replace the slats 40. At the back of the bottom base 32 is a belt clamping device 62. For additional support an angle brace 36 connects and reinforces the back and bottom bases. This angle brace 36 also serves as a connection point for the seatbelt 38. A seat 42 is affixed to this L shaped frame and the mast wheels 30 are rotationally mounted to and extend from the sides of the back base 34. In the preferred embodiment there are only four mast wheels 30 used although more could be used.

The seat 44 is made of a lightweight polymer and has a molded shape that incorporates sides with "L" shaped handle holes 46 formed therethrough. The molded sides also prevent the person being raised from getting their fingers into any potential pinch points between the mast wheels 30 and the mast. The seat preferably has a high gloss finish so that is it easier to load the downed person onto the seat. Slippage is controlled by the contours on the seat and may be adjusted by altering the gloss of the seat surface finish. The seatbelt retains the disabled person from leaning forward. This is especially important when the lifted person is a man or a person that has a heavy upper torso.

Figure 8:
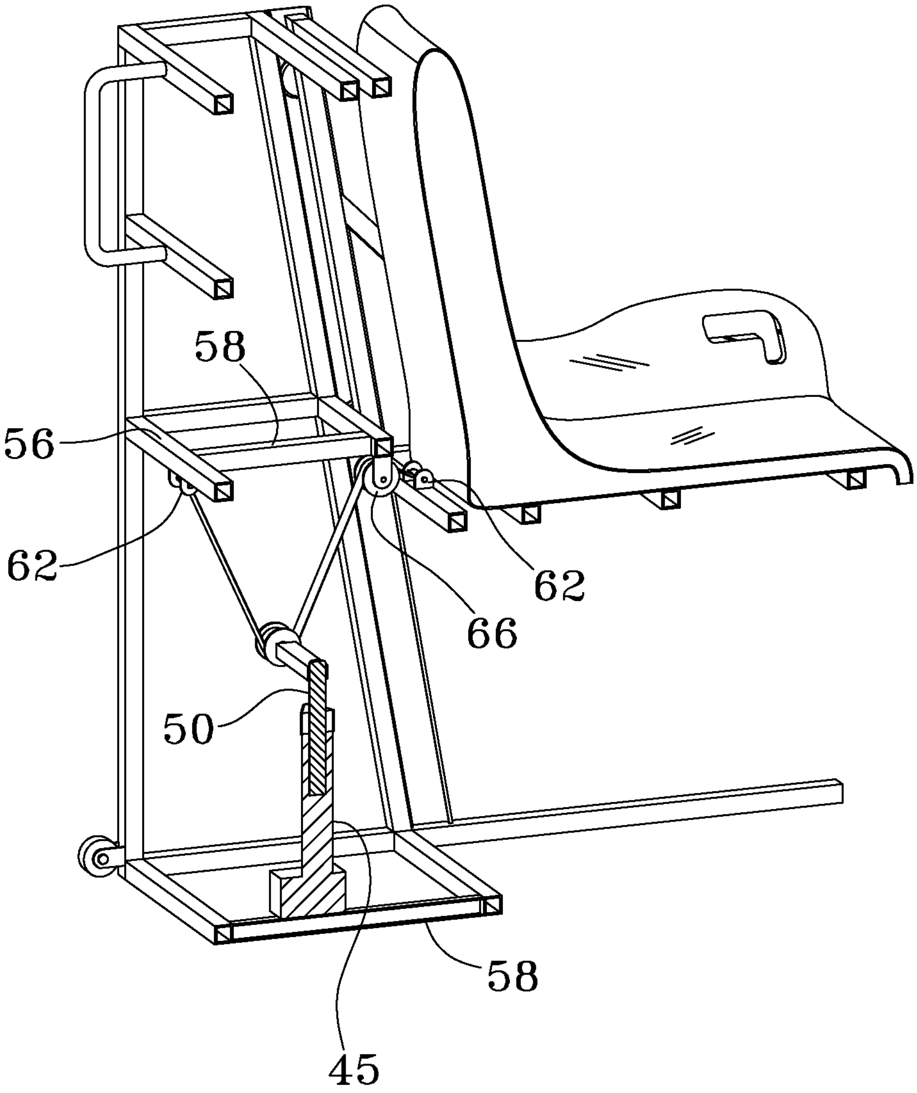
FIG. 8 is a cutaway cross section side perspective view of the lift chair in its raised.

The width between the outsides of the bottom base 32 is less than the distance between the inside of the horizontal base support legs 10. In this way, when fully lowered the lift carriage's bottom base 32 rests directly on the ground and within the footprint of the base frame 4. In the preferred embodiment the lift carriage bases are made from square tubing in the ½" to ¾" range. The seat 42 thus descends in its lowest position to approximately this distance from the ground as the lift carriage's bottom base 32 contacts on the ground. However, it is known that if an optional front drop lip or roll is incorporated into the seat 42 then the seat would actually reach the ground as well. (FIG. 8) To maximize the amount of friction the chair lift 2 has when in solid contact with the ground, rubber strips may be placed on the bottom faces of the bottom base 32 and the base support legs 10. This prevents the unit from shifting when a heavier person is attempting to get onto the seat 42.

Figure 5:
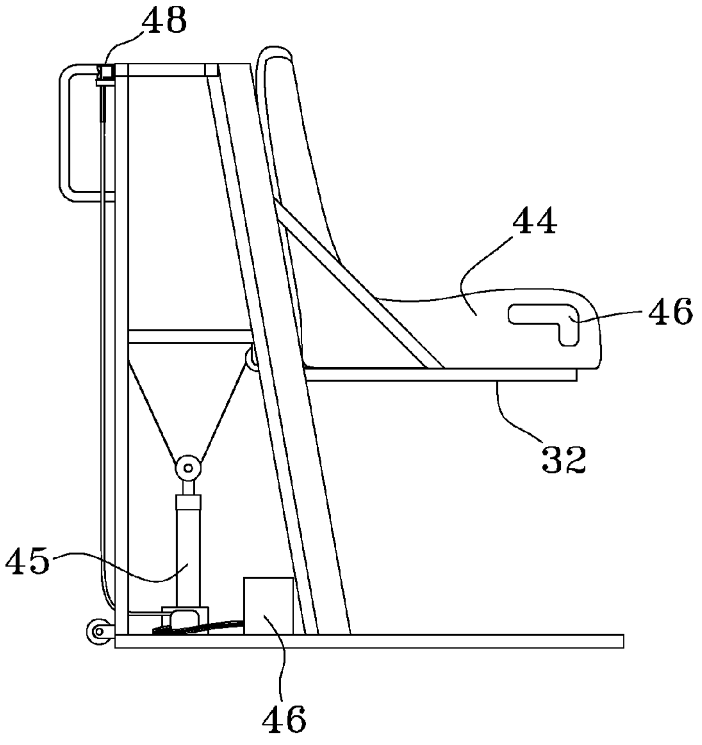
FIG. 5 is a side view of the lift chair in its raised position.
Figure 6:
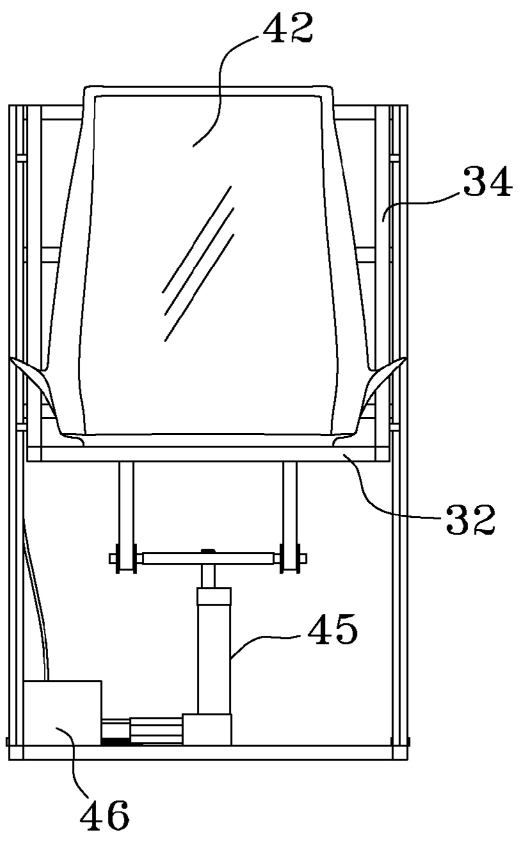
FIG. 6 is a front view of the lift chair in its raised position.
Figure 7:
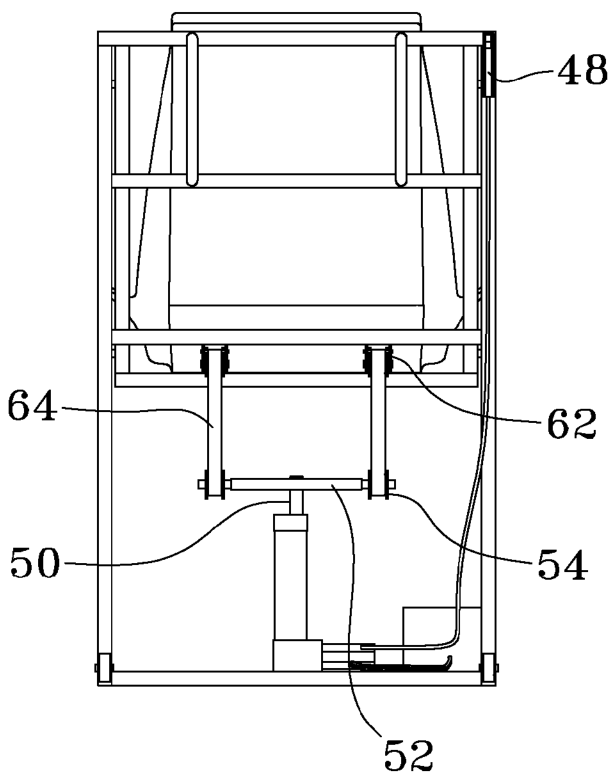
FIG. 7 is a back view of the lift chair in its raised position.

The lift system 6 utilizes a high torque DC electric ball screw linear actuator 45 that is mounted onto a cross member 58 affixed to the base frame 4. In the preferred embodiment it has a 10:1 gearing ratio for slow smooth movement and uses a battery powered actuator although it may also be powered by a 110 volt AC power supply that is rectified and transformed to the appropriate DC voltage. The power housing 46 contains the battery and the rectifier and transformer. Connection of the AC power is by an extension cord that plugs into the power housing 46. The operation of the linear actuator 45 is by a wired remote control that may be detachably affixed to the base frame 4. (FIGS. 5 and 7). The linear actuator 45 has an extendable ram 50 having at least 12" of vertical travel. At the top of the ram 50 is a "T" bar 52 having first belt pulleys 54 rotationally affixed at either end. Above the linear actuator 45 is a lift frame 56 affixed to the base frame 4. This lift frame 56 is a set of linear members affixed so as to form a rectangular framework between the vertical supports 12 with two stiffening members 58 fitted therein. From this lift frame 56 extends two pulley brackets 60 with two rotational second belt pulleys attached thereto, and two belt clamping devices 62. There are two substantially similar, independent belts 64 affixed at their first ends to the belt clamping devices 62 on the lift frame 56, looped around the underside of the first belt pulleys 54, looped around the top of the second belt pulleys and then having their second ends affixed to the belt clamping devices 62 on the back of the bottom base 32 (FIGS. 6-8) although they may be affixed to any other suitable place on the lift carriage 8. The first belt pulleys 54 are located approximately midpoint between the belt clamping devices one the lift frame and the belt clamping pulleys on the base frame 4.

The belts 64 are of a polymer design, strengthened by fiberglass cord or the like capable of handling the most obese persons without breaking.

In operation, once a person has collapsed onto the floor, the chair lift 2 is tilted back by its handles 22 until the wheels 24 contact the ground and the unit can be wheeled to where it is needed. When this location is reached, adjacent the downed person, the chair lift 2 is returned to its resting position wherein the base frame 4 and the bottom base 32 of the lift carriage 8 all reside on the floor in a nested configuration. (In this configuration the linear actuator ram 50 is at its fully extended position.) (FIG. 1) The downed person then can scoot themselves backward onto the glossy, slippery surface finished seat 42 and then connect the seat belt 38 around them. (The seat belt is an option and may not be utilized in certain situations.) Optionally, they can just rest their elbows on the seat 42 or grasp onto the L handles or if possible they can be gently slid onto the seat 42. Then the lift can be started with the remote control 48. The linear actuator 42 is energized to drive the ram 50 to its retracted position causing the second ends of the belts affixed to the belt clamping devices 62 on the back of the bottom base 32 to rise in the air lifting the lift carriage 8 and the seat 44. The pulley arrangement doubles the amount of lift carriage travel as compared to the ram stroke. In the preferred embodiment the chair lift can be raised 24" off of the floor, although the chair lift 2 and ram 50 can be dimensionally sized for higher lifts. It is known that the height to which a chair can be raised is a function of the length of the stroke of the linear actuator ram and the length of the mast so different height unit can be built following the disclosed specification.

For safety purposes the chair lift 2 utilizes a redundant dual belt system. This dual belt system also ensures that the seat 42 raises evenly no matter how the seat 42 is loaded. The linear actuator is of a commercially available model and the "T" bar 52 attaches conventionally to the top of the ram 50. The dual power option ensures that the unit can always be used in an emergency despite the condition of the battery although the high gearing reduces the amount of power required and size of the motor, therein prolonging battery life.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed.

The invention claimed is:

1. A portable chair lift adapted to pass through standard sized residential doorways and to help raise a collapsed or fallen person off the ground within a building, comprising:

a rollable, base frame that resides directly on the ground when not in a tipped, rollable configuration, wherein said base frame has a mast that extends from the horizontal plane of the base frame, said mast comprising two parallel C channels affixed to said base frame, said C channels acting as a guide track to rollably contain lift chair mast wheels, and said base frame has two horizontal base support legs arranged in a parallel configuration, said legs having an opposing, inside face and an outside face, said outside faces having a maximum distance between them of 29½ inches;

a lift carriage capable of being raised or lowered, nestled within said base frame, said lift carriage also residing directly on the ground when fully lowered and the base frame not in a tipped rollable configuration, wherein said lift carriage has an L shaped frame affixed to a seat and with at least two mast wheels extending therefrom, said mast wheels engageable with said base frame for rolling movement of said lift carriage with respect to said base frame, said movement having a vertical component, wherein said lift carriage's L shaped frame has an outside horizontal dimension that is less than a distance between said inside faces of said horizontal base support legs such that said lift carriage can reside in a nestled configuration within said base frame;

a lift system operably connected between said base frame and said lift carriage so as to raise or lower said lift carriage within said base frame, wherein said lift system has two substantially similar belts each having a first end affixed to said base frame and a second end affixed to said lift carriage;

a linear actuator having an extendable ram and affixed to the base frame;

a power source operatively connected to said linear actuator;

a T bar having two ends, and affixed to said extendable ram, said T bar having a first belt pulley rotationally affixed at either of said ends;

a lift frame affixed to the base frame with two second belt pulleys rotationally attached thereto, and two distal belt clamping devices thereon;

two proximate belt clamping devices attached to said lift carriage; and two substantially similar belts having a distal end and a proximate end;

wherein said distal ends of said belts are attached to the distal belt clamping devices on the lift frame, and said belts are looped around said first belt pulleys and said second belt pulleys with their proximate ends affixed to the proximate belt clamping devices on the lift carriage.

2. The portable lift chair of claim 1 wherein said first belt pulleys are located approximately midpoint between the distal belt clamping devices and the second belt pulleys.

3. The portable lift chair of claim 1 wherein said mast extends at an angle from a vertical plane such that when in operation said lift carriage rises diagonally.

4. The portable lift chair of claim 2 wherein the lift system linear actuator utilizes a high torque DC electric ball screw raising mechanism.

5. The lift chair of claim 4 wherein said power source is electricity provided by a battery or an AC power outlet, and may be operated by a remote control that is detachably affixed to said base.

6. The lift chair of claim 5 wherein said belts are of a polymer design, strengthened by fiberglass cord or the like.

7. The portable lift chair of claim 6 wherein said seat has a glossy, slick surface finish.

8. The portable lift chair of claim 7 wherein said seat has a drop lip that extends to contact the ground when the lift carriage is in its fully lowered position.

9. The portable lift chair of claim 8 wherein said lift carriage has a seat belt affixed thereto.

10. The portable lift chair of claim 9 wherein said lift carriage's L shaped frame is made of a generally planar bottom base affixed to a generally planar back base and having a pair of strengthening braces therebetween.

* * * * *